United States Patent [19]

Fowler

[11] 4,430,576
[45] Feb. 7, 1984

[54] REMOTE LOAD SELECTOR CIRCUIT AND METHOD

[76] Inventor: Rick Fowler, 4306 Shilling Way, Dallas, Tex. 75237

[21] Appl. No.: 318,393

[22] Filed: Nov. 5, 1981

[51] Int. Cl.$^3$ ............................................. H02U 3/00
[52] U.S. Cl. ...................................... 307/38; 307/39; 340/825.77; 318/305
[58] Field of Search ..................... 307/39, 29, 87, 130, 307/38, 86; 340/825.77; 318/305

[56] References Cited

U.S. PATENT DOCUMENTS

| | | | |
|---|---|---|---|
| 4,028,620 | 6/1977 | Kitagana et al. | 302/38 |
| 4,138,627 | 2/1979 | Canic | 307/39 |

Primary Examiner—E. A. Goldberg
Assistant Examiner—Todd E. DeBoer
Attorney, Agent, or Firm—Hubbrd, Thurman, Turner & Tucker

[57] ABSTRACT

A method and circuit for controlling the selection of remote electrical loads. An illustrated embodiment of the remote load selector circuit is depicted in conjunction with an electric ceiling fan and is utilized to select rotation direction, light operation and one of several motor speeds. A remote sending unit is utilized to couple a selected fraction of the line supply voltage to the control unit. The selected fractional line supply voltage is then rectified, filtered and applied to a plurality of individually biased sensing units. Each sensing unit is utilized to select a different load condition and the output of each sensing unit is also utilized to disable the preceding sensing unit so that only the sensing unit with the highest bias will generate an output. A relay, multivibrator or other switching means is coupled to the output of each sensing unit and is utilized to select a desired load condition.

11 Claims, 1 Drawing Figure

REMOTE LOAD SELECTOR CIRCUIT AND METHOD

BACKGROUND OF THE INVENTION

This invention relates in general to circuits for remotely selecting an electrical load and in particular to circuits in which it is desired to control a plurality of electrical load conditions by means of a single wire pair.

As electronic circuitry becomes increasingly complex, and more and more functions are electrically controlled, the selection of one of a plurality of electrical load conditions has become a common problem. In the past, a simple on/off switch was utilized for each function or load and multiple functions or loads were controlled utilizing multiple control wire pairs and switches. However, as the practice of retrofitting modern electronic devices into existing buildings and structures becomes more common, the problem of controlling multiple electrical loads with a single wire pair becomes increasingly important.

SUMMARY OF THE INVENTION

It is therefore one object of the present invention to provide an improved remote load selector circuit.

It is another object of the present invention to provide an improved method of selecting one of a plurality of remotely located electrical loads.

It is yet another object of the present invention to provide an improved remote control selector circuit capable of controlling a plurality of electrical loads utilizing a single wire pair.

The foregoing objects are achieved as is now described. A remote sending unit is utilized to couple a selected fraction of the line supply voltage to the control unit. The selected fractional line supply voltage is then rectified, filtered and applied to a plurality of individually biased sensing units. Each sensing unit is utilized to select a different load condition and the output of each sensing unit is also utilized to disable the preceding sensing unit so that only the sensing unit with the highest bias will generate an output. A relay, multivibrator or other switching means is coupled to the output of each sensing unit and is utilized to select a desired load condition.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
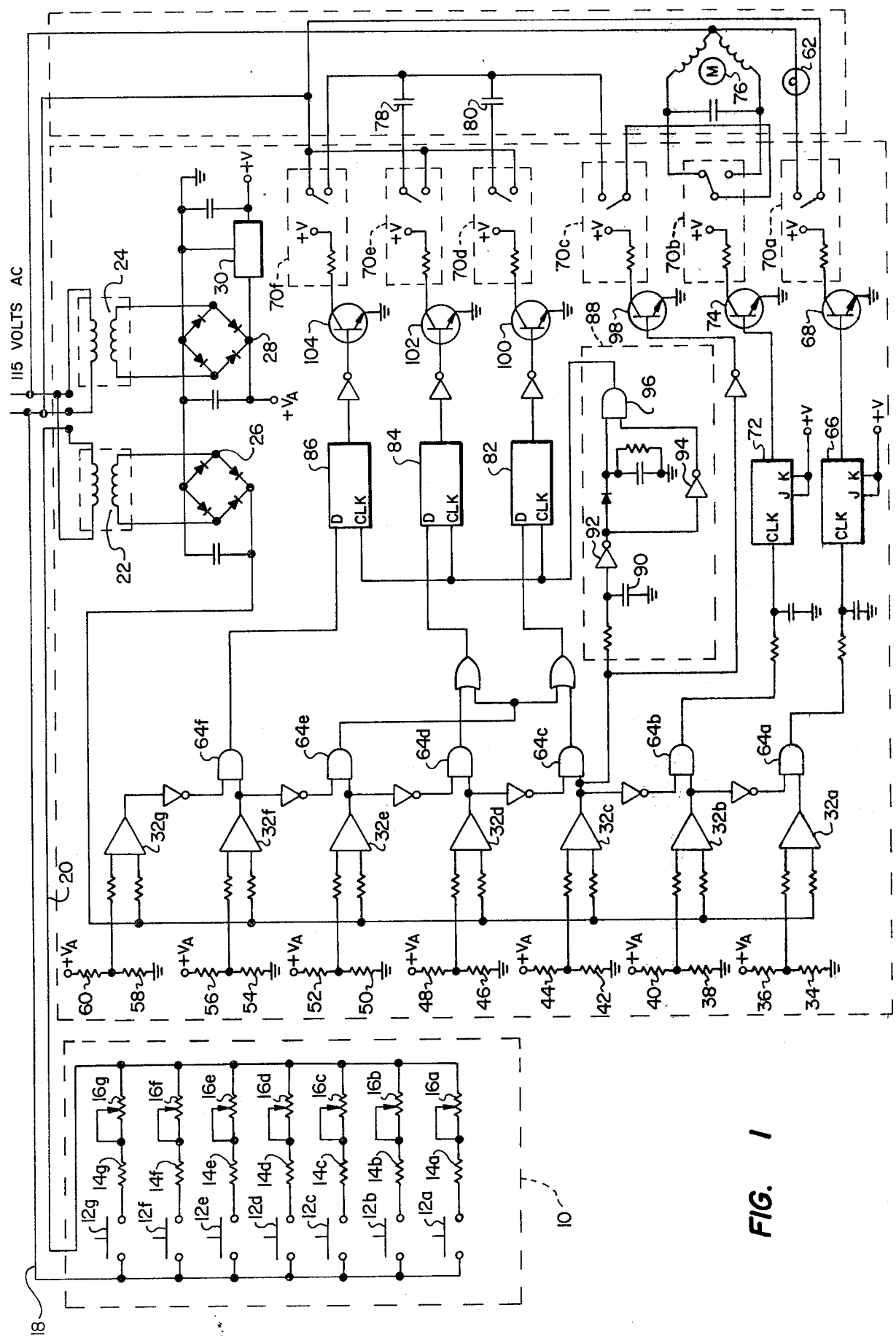
FIG. 1 depicts a schematic diagram of one embodiment of the remote load selector circuit of the present invention.

With reference now to FIG. 1, there is depicted a schematic diagram of a preferred embodiment of the present invention. While the remote load selector circuit of the present invention has many varied applications, the depicted embodiment, for the purpose of illustration, is shown being utilized to control the functions typically associated with a standard electrical ceiling fan. That is, the direction of motor rotation, fan speed and light operation are the multiple electrical loads or functions being controlled by means of a single wire pair such as is typically found in a household electrical circuit.

Remote sending unit 10 is located, in a preferred embodiment of the present invention, in a wall switch receptacle in the position previously occupied by a single on/off switch. Remote sending unit 10 consists of a plurality of normally open, momentary contact electrical switches, labeled 12a-12g. In series with each momentary contact switch is a fixed resistor 14a-14g and a variable resistor 16a-16g. The resistive portion of each individual leg of the electrical circuit contained within remote sending unit 10 is utilized to drop a selected portion of the line voltage applied across wire pair 18 and 20.

The output of remote sending unit 10 is applied via wire pair 18 and 20 to transformer 22. Line supply voltage is also applied to transformer 24. The secondaries of transformers 22 and 24 are coupled to full wave rectifiers 26 and 28 respectively. One output of full wave rectifier 28 is applied to voltage regulator 30 and is filtered and utilized to provide regulated operating voltage throughout the control circuit of the present invention. The other output of rectifier 28 is unregulated and is utilized to provide the reference voltages which pre-bias the sensing network. By utilizing unregulated voltage to pre-bias the sensing network, the effect of variations in line voltage upon the difference between bias voltage and input to the sensing network is minimized.

The output of rectifier 26 is filtered and coupled to one input of a plurality of pre-biased operational amplifiers 32a-32g which form a sensing network. The filtered output of rectifier 26 will be a DC voltage which will vary in level according to the amount of line voltage dropped across the resistive portion of a selected leg of remote sending unit 10. Thus, the amount of voltage output by rectifier 26 may be controlled by means of the selection and depression of any one of the momentary contact switches which are contained within remote sending unit 10.

Operation amplifiers 32a-32g are pre-biased by means of the voltage divider networks formed by resistors 34-60. In the disclosed embodiment, a voltage level of 0.41 volts is applied to the positive input of operational amplifier 32a. The voltage levels applied to operational amplifiers 32b-32g are 0.73 volts, 1.80 volts, 2.29 volts, 2.58 volts, 2.74 volts and 3.0 volts respectively. As those skilled in the art will appreciate, when the filtered output of rectifier 26 is applied simultaneously to each of the negative inputs of operational amplifiers 32a-32g, those operational amplifiers biased to a voltage level below the filtered output of rectifier 26 will begin conduction.

In the disclosed embodiment, operational amplifier 32a is utilized to control the operation of lamp 62. When the output of rectifier 26 exceeds the bias voltage present on the positive input of operational amplifier 32a, operational amplifier 32a will begin conduction. The output of operational amplifier 32a is applied to logic gate 64a. The other input to logic gate 64a is an inverted output of operational amplifier 32b and thus, logic gate 64a will have an output only when operational amplifier 32a is conducting and operational amplifier 32b is not conducting.

The output of logic gate 64a is coupled to the clock input of bistable multivibrator 66 and is effective to change the state of that multivibrator. Multivibrator 66 is coupled to transistor 68 which is utilized to operate relay 70a. Relay 70a in turn controls the contacts which operate lamp 62. In alternate embodiments, relays 70a–70f may be replaced with any of the various forms of solid state switching devices which are known in the art.

If the output of rectifier 26 is sufficiently high to cause operational amplifier 32b to conduct, the output of operational amplifier 32a will be disabled at logic gate 64a and the output of operational amplifier 32b will be coupled to logic gate 64b. The other input of logic gate 64b is an inverted output of operational amplifier 32c and thus, logic gate 64b will have an output only when operational amplifier 32b is conducting and operational amplifier 32c is not conducting.

In a manner similar to that described above, the output of logic gate 64b is utilized to change the state of bistable multivibrator 72, which drives transistor 74 and thus operates relay 70b. Relay 70b is utilized to couple line voltage to the forward or reverse windings of fan motor 76, thus controlling the direction of rotation of a ceiling fan.

Operational amplifiers 32c, 32d, 32e and 32f are utilized, in the disclosed embodiment of the present invention, to select from one of four different speed settings for the electric ceiling fan by placing various capacitors in series with the line voltage applied to the windings of fan motor 76. D type multivibrators 82, 84 and 86 along with speed control clock circuit 88 are utilized to determine which speed is selected. The outputs of D type multivibrators 82, 84 and 86 are determined by the D input whenever a clock signal is triggered. A clock signal will be generated by speed control clock circuit 88 whenever operational amplifier 32c is conducting.

Operational amplifier 32c will conduct when the output of rectifier 26 is sufficiently high to overcome the pre-biased state of operational amplifier 32c. One output of operational amplifier 32c is applied to speed control clock circuit 88 and is utilized to charge capacitor 90. The time delay generated by the charging of capacitor 90 is utilized to allow the D inputs to multivibrators 82, 84 and 86 to stabilize. When capacitor 90 charges sufficiently, the output of inverter 92 goes to a logic low, causing the output of inverter 94 to go to a logic high. Logic gate 96 will have a high output until the resistive/capacitive network on the input of logic gate 96 discharges. At that time the output of logic gate 96 will go to a logic low, a clock pulse has been generated, and the data at the D inputs of multivibrators 82, 84 and 86 will be latched. Assuming the output of rectifier 26 is sufficiently high to cause operational amplifier 32c to conduct (recalling that operational amplifiers 32a and 32b will conduct, however the outputs will be inhibited by the conduction of operational amplifier 32c) a clock pulse will be generated by speed control clock circuit 88 and a logic high output will be coupled out of multivibrator 82. The output of multivibrator 82 is utilized to drive transistor 100 and in turn operate relay 70d. Relay 70d serves to couple capacitor 80 in series with the line voltage supply to fan motor 76 and thus lower the voltage applied, resulting in a lower speed operation.

Similarly, operational amplifier 32d operates in conjunction with multivibrator 84, transistor 102 and relay 70e to couple capacitor 78 in series with the line voltage applied to fan motor 76. If operational amplifier 32e is selected, both multivibrator 82 and multivibrator 84 change states, causing line voltage to be applied to fan motor 76 through both capacitor 78 and capacitor 80.

Finally, for the highest possible speed setting, if operational amplifier 32f is selected, the output of operational amplifier 32f will operate in conjunction with multivibrator 86 and transistor 104 to operate relay 70f. Relay 70f operates to apply line voltage directly to the motor windings of fan motor 76.

Referring again to operational amplifier 32c, it should be apparent that an additional output of operational amplifier 32c is coupled to transistor 98 and is utilized to operate relay 70c. Relay 70c thus energizes any time a speed control operational amplifier is selected and is utilized to allow the charge on capacitors 78 and 80 to dissipate before switching. This circuit is utilized to increase the reliability and life of the switching contacts in the relays.

The remote load selector circuit of the present invention may be utilized to shut the ceiling fan off if the output of the rectifier 26 is sufficiently high to cause operational amplifier 32g to conduct. The outputs of operational amplifiers 32f, 32e, 32d and 32c will all be disabled and a logic low signal is applied to the D inputs of multivibrators 82, 84 and 86. The clock pulse generated by speed control circuit 88 will thus cause a logic low signal to be coupled out of multivibrators 82, 84 and 86 which will result in relays 70d, 70e and 70f opening and no line voltage will be applied to fan motor 76.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. Apparatus for remotely controlling a plurality of functions comprising:
   first means for providing a plurality of discrete momentary voltage levels;
   a plurality of sensing means coupled to and remotely located from said first means, each of said plurality of sensing means for detecting a particular momentary voltage level; and
   control means coupled to each of said plurality of sensing means for controlling a function in response to the detection of said particular momentary voltage level.

2. The apparatus according to claim 1 wherein said first means comprises a plurality of selectable resistive networks coupled across a supply voltage.

3. The apparatus according to claim 2 wherein said plurality of sensing means comprises a plurality of operational amplifiers, each of said operational amplifiers adapted to receive a selected bias voltage at one input thereof.

4. The apparatus according to claim 3 wherein said selected bias voltage is unregulated whereby variations in said supply voltage will have minimal effect upon the operation of said sensing means.

5. The apparatus according to claim 3 wherein each of said control means comprises a bistable multivibrator for changing states in response to the conduction of each said plurality of operational amplifiers.

6. Apparatus for remotely controlling a plurality of functions comprising:

first means for providing a plurality of discrete momentary voltage levels;

a plurality of sensing means coupled to and remotely located from said first means, a first of said plurality of sensing means for detecting a momentary voltage level in excess of a first voltage, and each successive sensing means for detecting a selected momentary voltage level in excess of the momentary voltage level detected by a pervious sensing means;

means coupled to the output of each of said successive sensing means for disabling the output of said previous sensing means in response to the detection of said selected momentary voltage level; and control means coupled to each of said plurality of sensing means for controlling a function in response to said detection of a selected momentary voltage level.

7. The apparatus according to claim 6 wherein said first means comprises a plurality of selectable resistive networks coupled across a supply voltage.

8. The apparatus according to claim 7 wherein said plurality of sensing means comprises a plurality of operational amplifiers, each of said operational amplifiers adapted to receive a selected unregulated bias voltage at one input thereof whereby variations in said supply voltage will have minimal effect upon the operation of said sensing means.

9. The apparatus according to claim 8 wherein each of said control means comprises a bistable multivibrator for changing states in response to the conduction of each said plurality of operational amplifiers.

10. A method of selecting one of a plurality of electrical loads for use with a system having manually operable switching means coupled by a single electrical wire pair to a plurality of remotely located electrical loads, comprising the steps of:

generating a particular momentary voltage level selected from a plurality of discrete voltage levels by means of said momentary manually operable switching means;

applying said particular voltage level to said single electrical wire pair;

remotely detecting said voltage level with a particular momentary one of a plurality of voltage level detectors; and selecting a particular electrical load in response to said detection of said particular voltage level.

11. A method of selecting one of a plurality of electrical loads for use with a system having manually operable switching means coupled by single electrical wire pair to a plurality of remotely located electrical loads, comprising the steps of:

generating a particular momentary voltage level selected from a plurality of discrete voltage levels by means of said manually operable switching means;

applying said particular momentary voltage level to said single electrical wire pair;

remotely detecting said particular momentary voltage level with a plurality of voltage level detectors, each one of said voltage level detectors detecting momentary voltage levels in excess of a preselected detection level;

selectively disabling the outputs of all voltage level detectors other than the output of the one voltage level detector detecting said particular momentary voltage level and having the highest preselected detection level; and selecting a particular electrical load in response to said detection of said particular momentary voltage.

* * * * *